M. R. HICKMAN.
AIR SEPARATOR FOR FEED WATER.
APPLICATION FILED FEB. 20, 1922.
1,426,076.
Patented Aug. 15, 1922.
4 SHEETS—SHEET 3.
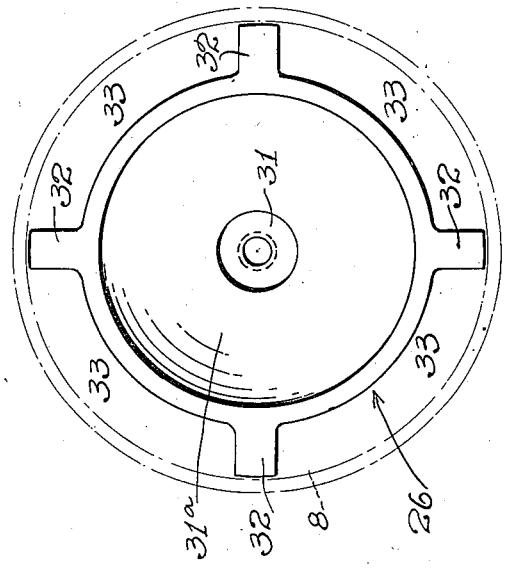
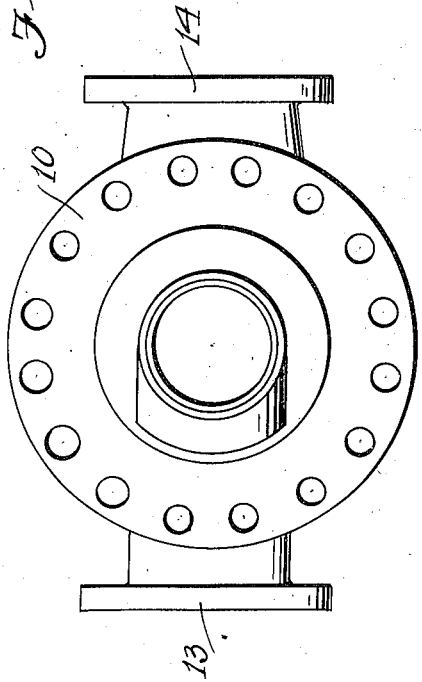
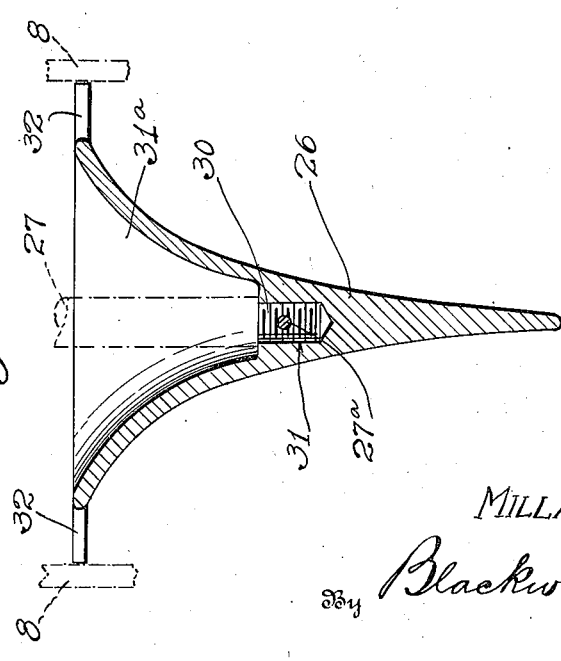
Inventor
MILLARD R. HICKMAN
By Blackwood Bros.,
Attorneys.

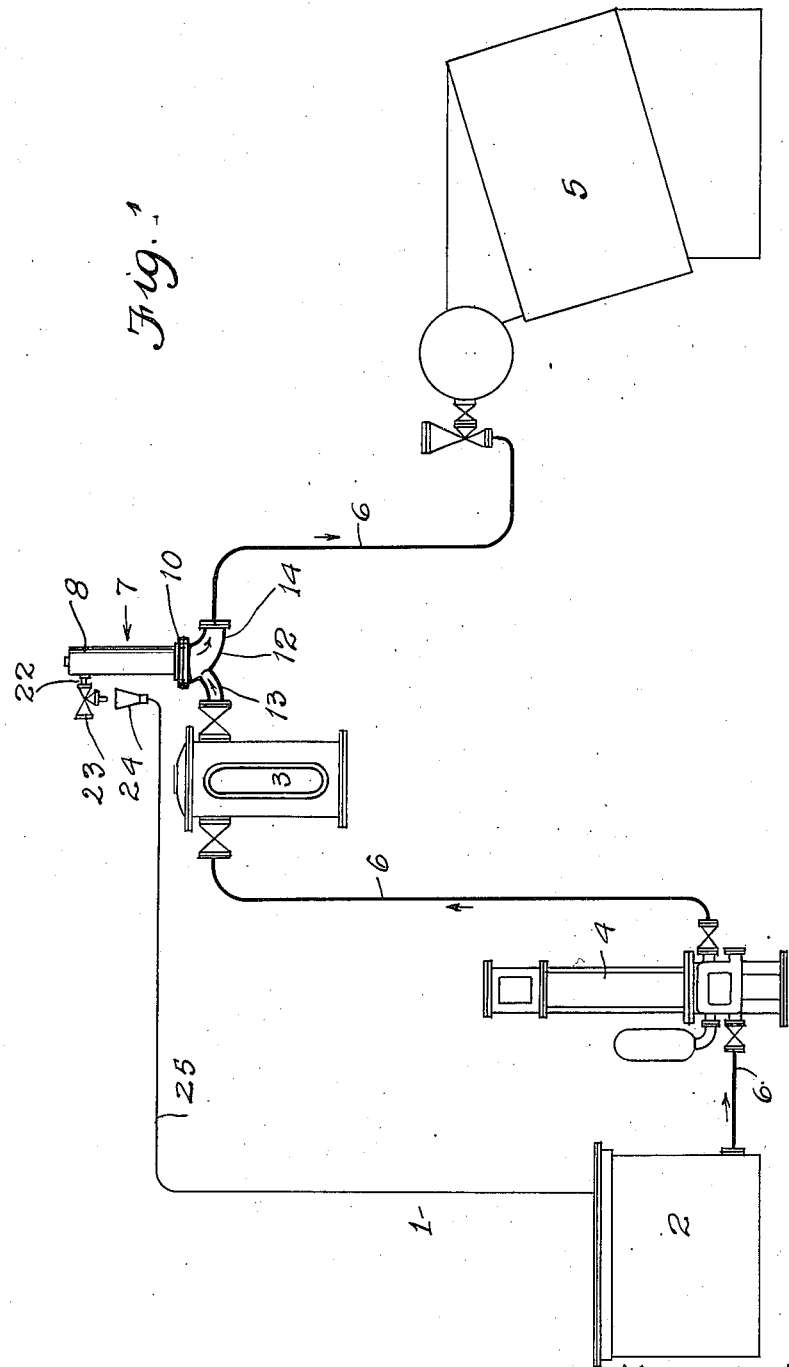

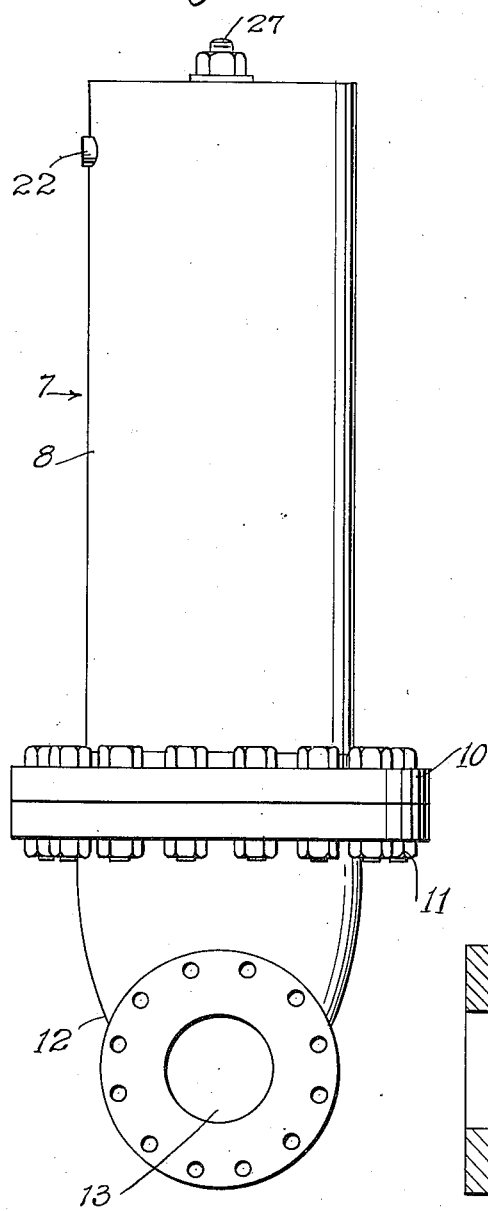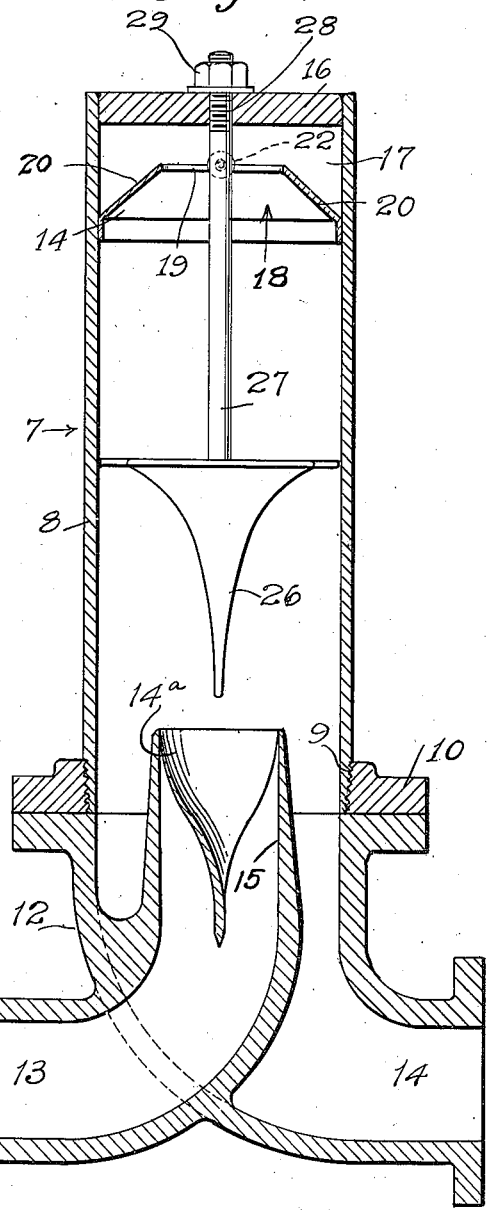

M. R. HICKMAN.
AIR SEPARATOR FOR FEED WATER.
APPLICATION FILED FEB. 20, 1922.
1,426,076.
Patented Aug. 15, 1922.
4 SHEETS—SHEET 4.
Fig. 8.
Fig. 7.
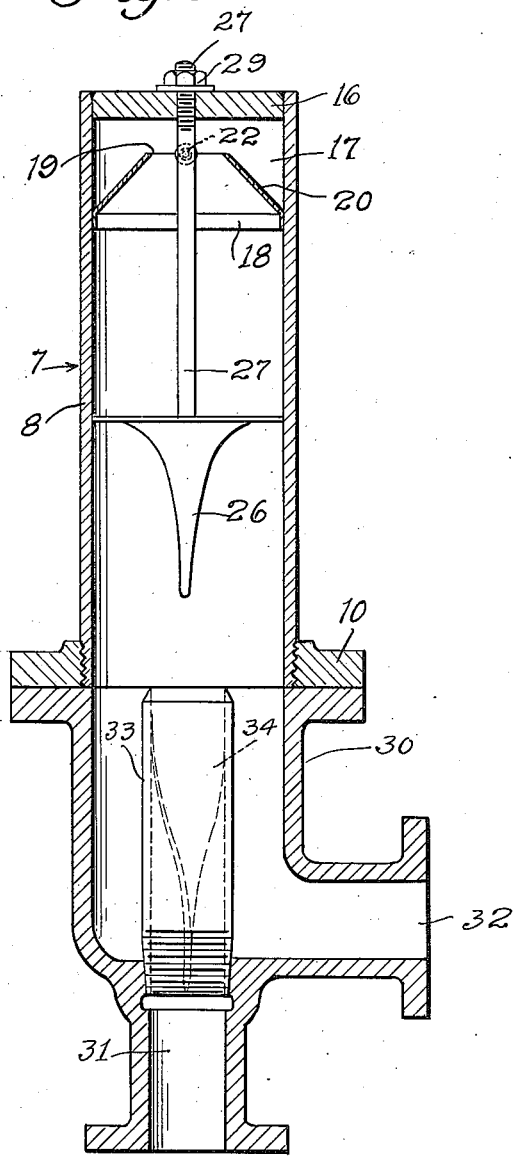
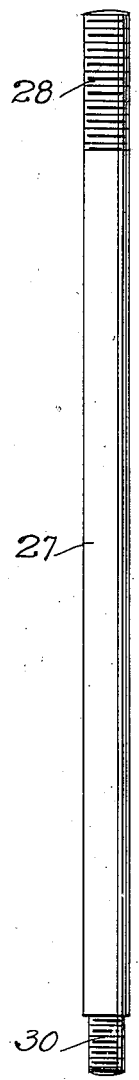
Inventor
MILLARD R. HICKMAN
By Blackwood Bros.,
Attorneys

UNITED STATES PATENT OFFICE.

MILLARD R. HICKMAN, OF SAN FRANCISCO, CALIFORNIA.

AIR SEPARATOR FOR FEED WATER.

1,426,076.  Specification of Letters Patent.  Patented Aug. 15, 1922.

Application filed February 20, 1922. Serial No. 538,054.

*To all whom it may concern:*

Be it known that I, MILLARD R. HICKMAN, residing at San Francisco, in the county of San Francisco and State of California, a citizen of the United States, have invented certain new and useful Improvements in Air Separators for Feed Water; and I do hereby declare the following to be a full, clear, and exact description of the invention, such as will enable others skilled in the art to which it pertains to make and use the same.

My invention relates to an improvement in air separators for feed water, and more especially to means for freeing or eliminating air from the feed water of a feed water system for boilers condensers etc.

Water at sixty degrees Fahrenheit contains as high as four per cent of air in suspension, water at one hundred and ninety degrees Fahrenheit and higher carries considerably less than one per cent, hence the action of the feed water heater not only raises the temperature of the water, but also concentrates the air into bubbles. These bubbles must be eliminated or extracted from the feed water of a feed water system, or else be carried into the boiler, steam and exhaust pipe lines, condensers, air pumps etc. causing the steel, iron or other metals of which they are made to rust, corrode or otherwise deteriorate.

The object of my invention is to obviate the above named difficulties by eliminating or freeing air from the feed water before entering the condenser, or boiler, whereby a higher vacuum is possible with the same air pump capacity or a smaller air pump may be used to produce the same vacuum.

A further object is to increase the life and safety of the feed water system by maintaining an air cushion at the top of the air separator chamber for the purpose of absorbing the water shock or the hammering due to the action of the pump or check valve.

A further object is to provide an air separator for feed water of a feed water system which is simple, inexpensive and durable in construction, has no movable parts to get out of order, insuring safety in operation, and in which no adjustments of the several parts are required or are necessary after the initial installation.

A still further object is to provide an air separator for the feed water of a feed water system which will separate or eliminate air from the feed water, collect the eliminated air and pass it off to the atmosphere through a suitable vent, and at the same time cause any residue of water which may have been carried by the eliminated air and that may remain the top of the cylinder to be returned to the hot well for further use.

The invention consists in the several features, and in the construction, combination and arrangement of such features as more fully hereinafter described and claimed.

Referring to the drawings:—

Fig. 1 is a diagrammatic view of an air separator system for feed water showing my air separator included therein.

Fig. 2 is an end elevation of the air separator.

Fig. 3 is a bottom plan view.

Fig. 4 is a central vertical section.

Fig. 5 is a top plan view of the conical deflector.

Fig. 6 is a vertical section taken between the lugs 32 of Figure 5.

Fig. 7 is an elevation of the supporting rod for the conical deflector.

And Fig. 8 is a sectional view of a modified form of my invention.

In the drawings, in which similar reference characters denote similar parts throughout the several views, 1 represents a feed water system for boilers which comprises, a hot well 2, feed pump 3, feed water heater 4, boiler 5, a plurality of connecting pipes 6, and my air separator 7 which is shown as installed in and connected with the feed water system, between the feed water heater 4 and the boiler 5.

The air separator 7 has a preferably cylindrical casing 8 provided with exterior screw-threads 9, at its lower end having a removable ring 10 thereon, which serves as a flange, and below the ring 10 and secured thereto by bolts and nuts 11 is a casting 12 having an upwardly curved inlet pipe 13, for the admission of feed water impregnated with air having its upper end tapering as at 15, and a downwardly curved pipe 14, for the outlet of the de-aerated feed water.

Secured within the upwardly curved pipe 1, by welding or in any other desired manner, a spirally twisted or curved strip 14ª, is provided, twisted to about one quarter turn, for the purpose of giving the incoming water a whirling motion, such centrifugal action causing the separation of the air and water.

A head or closure 16 is mounted in the upper end of the casing 8, which may be secured in place by welding or any other desired manner, and just below the head or closure 16 and spaced therefrom to form an air receiving chamber 17, a dished-shaped baffle 18 is provided secured in place by welding or in any other desired manner to the inner wall of the casing 8, and having an annular central opening 19, and slanting wall 20, at the upper portion of the casing 8, a short pipe 22 is provided having a vent or air cock 23 for the exhaust of air which has been separated or extracted from the feed water and 24 indicates a funnel situated just below the vent or air cock which catches or collects any residue of water which may be exhausted with the air through the vent or air cock and returns such water by means of the return drain pipe 25 to the hot well 2. If desired a pipe may be connected to the air vent or cock and its lower end extend into or to a funnel in the top of the hot well, instead of having the funnel adjacent the air vent or cock. Inside the casing 8 a cone shaped water deflector 26 is provided which is supported and held in the desired position by means of a rod 27 the upper end of which is mounted and held in the head or closure 16 by means screwthreads 28 and a nut 29, and the lower end of which is connected to the deflector 26 by means of screwthreads 30 which engage screwthreads 31, in the deflector 26, and 27ª indicates a cross pin which is driven through the deflector and the lower end of the rod 27 to keep the rod from being unscrewed or separated from the deflector. The conical deflector is provided with an inner central recess 31ª and with a plurality of exterior lugs 32 which engage the inner surface of the casing 8, and having a space or slot 33 between each of the lugs, such spaces allowing the air extracted from the feed water to pass therethrough into the upper portion of the casing 8.

The conical deflector may be adjusted to varying or different heights in the casing by the adjustment of the nut 29. The casing 8, deflector, 26, casting 12 are preferably formed of brass, while the head or closure 16, baffle 18 and nuts and bolts 11 are preferably formed of steel. I preferably lag the body of the separator to prevent radiation but have not shown it so in the drawings.

In the modified form of the invention shown in Figure 8 a casting 30 is provided having a vertical pipe 31 for the admission of feed water impregnated with air, and a lateral pipe 32 for the outlet of de-aerated feed water.

A vertical tube or nozzle 33 is secured in the upper part of the pipe 31 by being screwed therein and is provided with a spirally twisted or curved strip 34 for the same purpose as the strip 14ª shown in Figure 4 of the drawings.

In operation the feed water impregnated with air, which forms air bubbles, flows through the first section of pipe 6 into the feed pump 3, from the feed pump through pipe 6 into the inlet the second section of pipe 7, at line pressure, pipe 13 of the separator 7, flows upward and contacts with spirally twisted strip and the conical deflector and by the centrifugal force or action imparted thereby gives up or liberates the air therein, when the velocity drops approximately to one-fourth which permits the natural separation of the air from the water, and the liberated air flows upward through the baffle 18 into the air receiving chamber 17, after which it passes off through the vent or air cock 23 to the atmosphere and any residue or small quantity of water which may have been left in the liberated air will flow into the funnel 24 and return to the hot well 2 through the drain pipe 25, and at the same time the de-aerated water will pass downward and flow out through the pipe or outlet 14 into the third section of pipe 6 to the boiler 5.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:—

1. In an air separator for feed water, a casing having a water inlet provided with means for imparting a whirling motion to water passing therethrough, a water outlet, a deflector for causing the water to be de-aerated by centrifugal force, a baffle, a chamber for the reception of the air separated from the water and means for exhausting air from said chamber.

2. In an air separator for feed water, a casing provided with an inlet for water having means therein for imparting a whirling motion to the water passing therethrough, a water outlet, a head or closure for said casing provided with a rod depending therefrom, a stationary deflector mounted on said rod for causing the water to be de-aerated by centrifugal force and means for exhausting the air from the casing after it has been separated from the water.

3. In an air separator for feed water, a casing provided with an inlet and outlet for water, a head or closure provided with a rod depending therefrom, a stationary deflector mounted on said rod for causing the water to be de-aerated by centrifugal force, a baffle, a chamber between the head or closure and the deflector for the reception of the air separated from the water and means for exhausting the air from said chamber.

4. In an air separator for feed water, a casing provided with an inlet and an outlet for water, a head or closure provided with a rod depending therefrom, a conical deflector having exterior lugs and spaces at the upper portion, a chamber at the upper portion of the casing, for the reception of the air separated from the water and a vent in said chamber for exhausting the air to the atmosphere.

5. In an air separator for feed water, a casing provided with a casting having an inlet feed water pipe, an outlet feed water pipe surrounding said inlet pipe, a casing connected to and in communication with said inlet and outlet pipes provided with a head or closure, a rod depending from said head or closeure, a conical deflector mounted on said rod and provided with a plurality of exterior lugs at its upper portion, a space or opening between each of said lugs, a baffle, a chamber above said baffle and a vent or cock for exhausting air to the atmosphere.

6. In an air separator for feed water, a casing provided with an inlet and an outlet for water, said inlet provided with means for imparting a whirling motion to the water, a head or closure provided with an adjustable rod, a stationary deflector mounted on said rod for causing the water to be de-aerated by centrifugal force and means for exhausting the air from the water.

7. In an air separator for feed water, a casing provided with an inlet for feed water provided with spirally twisted means for the purpose of imparting a whirling motion to the water and an outlet for feed water, an adjustable deflector, a baffle above said deflector, a chamber between the top of the casing and the baffle, and an air exhaust vent communicating with said chamber.

8. In an air separator for feed water, a casing having a water inlet provided interiorly with spirally twisted means for the purpose of imparting a whirling motion to the water, a water outlet, a deflector for causing the water to be de-aerated by centrifugal force, a baffle, a chamber for the reception of the air separated from the water and means for exhausting air from said chamber.

9. In an air separator for feed water, a casing having a water inlet provided interiorly with spirally twisted means for the purpose of imparting to the water a whirling motion, a water outlet, a head or closure for said casing provided with a rod, a deflector mounted on said rod for causing the water to be de-aerated by centrifugal force, a baffle above said deflector, a chamber for the reception of the air separated from the water, and means for exhausting air from said chamber.

10. In an air separator for feed water, a casing having a water inlet having its upper end tapering, and provided interiorly with spirally twisted means for the purpose of imparting a whirling motion to the water, a water outlet surrounding said water inlet, a deflector for causing the water to be de-aerated by centrifugal force, a baffle, a chamber for the reception of the air separated from the water and means for exhausting air from said chamber.

11. In an air separator for feed water, a casing having a water inlet provided with means for imparting a whirling motion to the water passing therethrough, a water outlet, means for causing the water to be de-aerated, a baffle and a chamber for the reception of the air separated from the water.

In testimony whereof I have affixed my signature.

MILLARD R. HICKMAN.